United States Patent
Sun et al.

(10) Patent No.: US 7,077,463 B2
(45) Date of Patent: Jul. 18, 2006

(54) REAR FOLD DOWN CARGO SEAT WITH TILT DOWN CUSHION

(75) Inventors: Simon Sun, Ann Arbor, MI (US); Zorn Kojic, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/708,996

(22) Filed: Apr. 6, 2004
(Under 37 CFR 1.47)

(65) Prior Publication Data
US 2005/0225143 A1    Oct. 13, 2005

(51) Int. Cl.
*B60N 2/36* (2006.01)
*A47C 7/62* (2006.01)

(52) U.S. Cl. .................... 297/15; 297/331; 297/334; 297/378.1; 297/378.12; 297/378.13; 297/378.14; 297/188.08; 296/65.05; 296/65.09; 296/65.13; 296/65.16

(58) Field of Classification Search ............. 297/378.1, 297/257, 233, 248, 378.12, 378.13, 343, 297/188.08, 188.11, 15, 331, 334, 378.14; 248/424, 429, 430; 296/65.05, 65.09, 65.13, 296/65.16
See application file for complete search history.

(56) References Cited

U.S. PATENT DOCUMENTS

| | | | |
|---|---|---|---|
| 4,475,763 A | | 10/1984 | Hamatani et al. ......... 296/65 R |
| 4,869,541 A | | 9/1989 | Wainwright ............... 296/69.1 |
| 4,957,321 A | * | 9/1990 | Martin et al. ............ 296/65.09 |
| 5,273,336 A | | 12/1993 | Schubring et al. ......... 296/65.1 |
| 5,482,349 A | * | 1/1996 | Richter et al. ............... 297/15 |
| 5,527,087 A | * | 6/1996 | Takeda et al. ............... 297/15 |
| 5,542,745 A | * | 8/1996 | Takeda et al. ............ 297/15 X |
| 5,738,411 A | * | 4/1998 | Sutton et al. .......... 297/378.12 |
| 5,741,046 A | | 4/1998 | Leuchtmann et al. .. 297/378.13 |
| 5,826,942 A | * | 10/1998 | Sutton et al. .......... 297/378.12 |
| 5,941,602 A | * | 8/1999 | Sturt et al. ................ 297/15 X |
| 5,954,398 A | * | 9/1999 | Namba et al. ...... 297/378.12 X |
| 6,012,755 A | * | 1/2000 | Hecht et al. ............. 296/65.03 |
| 6,042,180 A | * | 3/2000 | Lombardi .............. 297/188.11 |
| 6,070,934 A | * | 6/2000 | Schaefer et al. .......... 297/15 X |
| 6,099,072 A | * | 8/2000 | Sturt et al. ..................... 297/15 |
| 6,113,187 A | * | 9/2000 | Sugiyama et al. ........ 297/15 X |
| 6,113,191 A | * | 9/2000 | Seibold ................... 297/378.1 |
| 6,123,380 A | * | 9/2000 | Sturt et al. ................ 297/15 X |
| 6,152,533 A | * | 11/2000 | Smuk ........................ 297/15 X |
| 6,183,033 B1 | * | 2/2001 | Arai et al. ............... 296/65.09 |
| 6,196,613 B1 | * | 3/2001 | Arai ........................ 296/65.13 |
| 6,234,553 B1 | * | 5/2001 | Eschelbach et al. ..... 296/65.14 |
| 6,293,603 B1 | * | 9/2001 | Waku et al. .............. 297/15 X |
| 6,347,834 B1 | | 2/2002 | Couasnon ................... 297/341 |
| 6,367,859 B1 | * | 4/2002 | Flory et al. ................ 296/68.1 |
| 6,371,558 B1 | | 4/2002 | Couasnon ................ 297/378.1 |
| 6,375,255 B1 | * | 4/2002 | Maruta et al. ................ 297/15 |
| 6,406,084 B1 | | 6/2002 | de Campos et al. .......... 296/66 |
| 6,536,843 B1 | * | 3/2003 | Severinski et al. ....... 297/15 X |

(Continued)

*Primary Examiner*—Rodney B. White
*Assistant Examiner*—Stephen Vu
(74) *Attorney, Agent, or Firm*—Bruce E Harang

(57) ABSTRACT

Disclosed is a folding split seat which is easy to move from a seating position to a cargo position and back and which accomplishes this by moving the seat cushion forward and downward out of the way of the folded seat back without the need to fold or flip the seat cushion. Also disclosed is a embodiment of the folding split seat that also provides for a reclining seat back.

16 Claims, 3 Drawing Sheets

U.S. PATENT DOCUMENTS

| | | | |
|---|---|---|---|
| 6,568,756 B1 * | 5/2003 | Sugimoto et al. | 297/334 X |
| 6,598,926 B1 * | 7/2003 | Price et al. | 296/65.09 |
| 6,629,721 B1 * | 10/2003 | Macey | 297/15 |
| 6,773,067 B1 * | 8/2004 | Kim | 297/15 X |
| 6,817,646 B1 * | 11/2004 | Kikuchi et al. | 296/65.05 |
| 6,817,670 B1 * | 11/2004 | Macey | 297/15 X |
| 6,827,394 B1 * | 12/2004 | Watanabe et al. | 297/15 |
| 6,874,840 B1 * | 4/2005 | Neale | 297/15 X |
| 6,908,155 B1 * | 6/2005 | Wieclawski | 297/378.12 X |
| 6,997,498 B1 * | 2/2006 | Oyama | 297/15 X |
| 6,997,500 B1 * | 2/2006 | Horsford et al. | 296/65.09 X |
| 2002/0043815 A1 | 4/2002 | de Campos et al. | 296/66 |
| 2002/0067056 A1 * | 6/2002 | Garrido et al. | 297/15 |
| 2003/0075946 A1 | 4/2003 | Neale et al. | 296/65.09 |
| 2003/0080601 A1 | 5/2003 | Charras et al. | 297/378.12 |
| 2004/0150243 A1 * | 8/2004 | Epaud et al. | 296/65.09 |
| 2006/0006704 A1 * | 1/2006 | Skelly et al. | 297/188.08 |

* cited by examiner

REAR FOLD DOWN CARGO SEAT WITH TILT DOWN CUSHION

BACKGROUND OF INVENTION

1. Field of the Invention

The present invention generally relates to a split fold down rear vehicle seat. More particularly the present invention relates to a split fold down rear vehicle seat that also has a reclining seat back. The present invention also relates to a split fold down rear vehicle seat in which the seat cushion is displaced downward and forward into the foot area and the seat back folds down into the area occupied by the seat cushion when in an upright or seating position.

2. Description of the Related Art

Folded seats and particularly split folded seats of the type common in vehicles having a rear cargo area either allow the vehicle to seat additional occupants or provide additional cargo space. Generally the seat is folded by the seat back pivoting at its lower edge and rotating the top edge forward and downward onto the seat cushion or into the area occupied by the seat cushion in its seating use position. Generally if the seat cushion does not move the folded seat back rests above the same plane as the cargo area. To overcome problem in the past the seat cushion either has generally be rotated forward in a manner similar to the seat back before or after the seat back has been rotated. This however requires additional operation by the operator to fold the seat such that the cargo area floor is in a single plane from front to back.

For example, U.S. Pat. No. 4,475,763 issued Oct. 9, 1984 to Hamatani et al teaches a split seat where the seat back may be rotated forward and downward over the corresponding seat cushion or the seat cushion may first be rotated forward and upward and then the corresponding seat cushion may be rotated forward and downward into the space previously occupied by the seat cushion.

U.S. Pat. No. 4,869,541 issued Sep. 26, 1989 to Wainwright teaches a folding seat where the seat back is first rotated forward and downward onto the seat cushion top surface and then the seat unit is rotated forward and downward folding the complete folding seat into the foot space in front of the seat cushion.

U.S. Pat. No. 5,273,336 issued Dec. 28, 1993 to Schubring et al teaches a seat having a folding seat back that folds forward and downward onto the upper surface of the seat cushion.

U.S. Pat. No. 5,741,046 issued Apr. 21, 1998 to Leuchtmann et al teaches a folding seat back split seat having a hinge allowing the seat back pivoting position to be farther forward over the seat cushion.

U.S. Pat. No. 6,347,834 issued Feb. 19, 2002 to Couasnon teaches a folding seat where the seat back is lowered by having the seat cushion move forward and the seat back is rotated forward and downward while the seat back lower edge is moved backward.

U.S. Pat. No. 6,371,558 issued Apr. 16, 2002 to Couasnon teaches a folding seat back member where the seat assembly is mounted on a track allowing longitudinal motion of the seat assembly at predetermined times.

U.S. Pat. No. 6,406,084 issued Jun. 18, 2002 to de Campos et al and the corresponding U.S. Patent Application Publication No. 2002/0043815 published Apr. 18, 2002 teaches two rows of folding seats having a board on the rear most row to cover the forward row to provide a smooth cargo area floor.

U.S. Patent Application Publication No. 2003/0075946 published Apr. 24, 2003 to Neale et al teaches a folding seat where the seat back is first rotated forward and downward and then the folded seat back and seat cushion are simultaneously rotated on the seat cushion front edge forward and upward.

U.S. Patent Application Publication No. 2003/0080601 published May 1, 2003 to Charras et al teaches an articulating hinge for use with a folding seat to allow for the seat back to be locked in intermediate positions between fully upright and fully folded down.

Thus, there is still a need for a folding split seat in which the seat cushion and seat back are moved from a seating position to a storage position without the need of multiple folding operations.

DISCLOSURE OF THE INVENTION

The present invention provides advantages and alternatives over the prior art by providing a folding split seat in which the seat cushion moves forward horizontally and downward simultaneously with the forward and downward rotation of the seat back top edge into the area occupied by the seat cushion in the seating position. With the appropriate vehicle floor configuration the present invention allows for a flat cargo area floor from front to rear.

According to a further aspect of the present invention, there is presented a split folding seat where the front edge of the seat cushion is mounted to legs pivotally mounted to the vehicle floor and the seat back bottom edge is mounted to a pair of longitudinal tracks as well as pivotally connected by a second pivot point to the rear edge of said seat cushion.

According to a further aspect of the present invention, there is presented a split folding seat where each side of said split folding seat independently slides, reclines and folds down to provide cargo floor area.

According to yet another aspect of the present invention there is presented a split folding seat is mounted on a vehicle floor panel configured to provide a flat load floor across the seat back and rear cargo areas when the present invention split folding seat is in a lowered or closed position.

According to a yet further aspect of the present invention there is provided a split folding seat assembly comprising a pair of passenger seats which may be independently folded from a seating position to a cargo position and back with a minimum of effort for use in a vehicle comprising in cooperative combination: a pair of seat cushion frames, each of said seat cushion frames being moveably mounted by their front edges to a pair of legs, and said pair of seat cushion frames rear edges moveably mounted to a corresponding pair of seat back frames by a pair of seat folding links and further each said seat cushion frame having a seat cushion mounted thereon; a pair of seat legs having one end of each of said pair of seat legs moveably mounted to the front edge of each of said seat cushion frames and the other end of each of said pair of seat legs moveably mounted to a vehicle floor; a pair of seat back frames, each of said seat back frames being moveably mounted on their bottom edges to the rear edge of the corresponding seat cushion frame by a pair of seat folding links, and further attached by their bottom edges by a pair of hinges to a pair of parallel seat tracks, and further each of said pair of seat back frames having a head restraint mounting member to which are attached a desired number of head restraints and each of said seat back frames having a seat back cushion mounted thereon; and a pair of parallel tracks, fixedly mounted to a vehicle floor, for each of said pair of passenger seats having a seat back frame mounted thereto by means of a hinge allowing the seat backs to be independently moved laterally along the pair of parallel tracks during the folding and unfolding of each of said passenger seats; thereby providing a split folding seat assembly in which the seat cushion is moved forward and downward into the passenger foot area and the seat back is moved forward and downward into the space previously occupied by the seat cushion providing a flat load floor over a cargo area and the seat back.

The present invention thus advantageously provides a split folding seat for use in a vehicle which is easy to move from a seating position to a cargo position and back with minimum effort.

DETAILED DESCRIPTION

Figure 1:
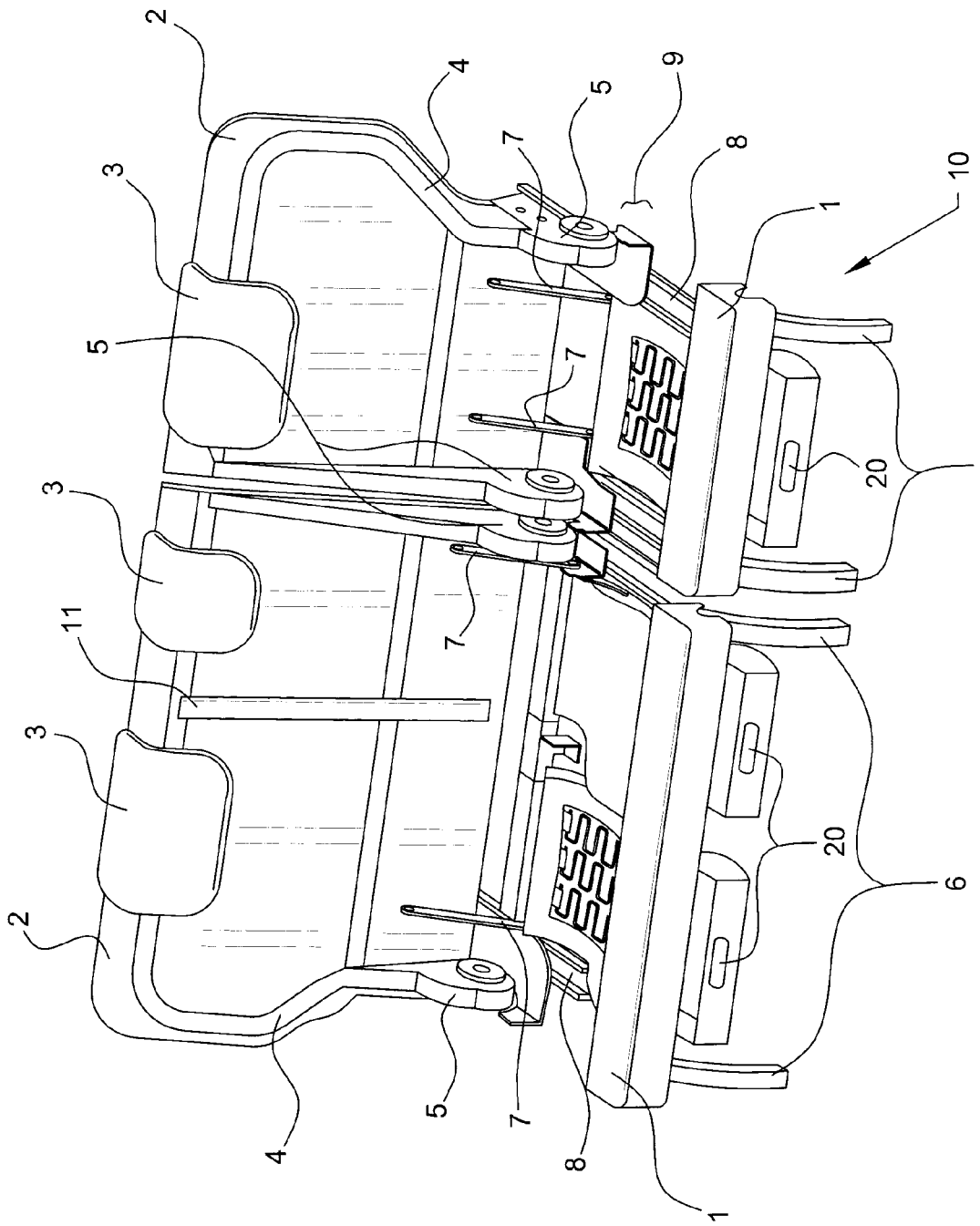
FIG. 1 shows a perspective front view of the split folding seat of the present invention in an upright or seating position with the seat cushion and seat back cushion removed to show more clearly the seat folding mechanism.

Reference will now be made to the drawings, wherein to the extent possible like reference numerals are utilized to designate like components throughout the various views. Referring to FIG. 1, which presents a front perspective view of a split folding seat 10 of the present invention with the seat cushion and seat back cushion removed for clarity comprising a seat cushion frames 1 moveably mounted on their front edges to legs 6 and moveably mounted on their back edges to a seat back frames 2 by linkage arms 7. Seat back frames 2 further having a head restraints 3 mounted on head restraint mounting members 4. In addition the larger seat portion of the split seat has an additional head restraint support member 11 further supporting the horizontal portion of head restraint mounting member 4.

As further shown in FIG. 1 seat back frames 2 are moveably mounted by hinges 5 to parallel track units 8, said track units 8 also being permanently mounted to vehicle floor 9. Track units 8 allow the lateral movement of the seat back frames 2. Hinges 5 allow the forward and downward movement of the top edge of seat back frames 2.

Also shown in FIG. 1 are optional storage units 20 which may be mounted to the bottom surface of seat cushion frames 1.

Figure 2:
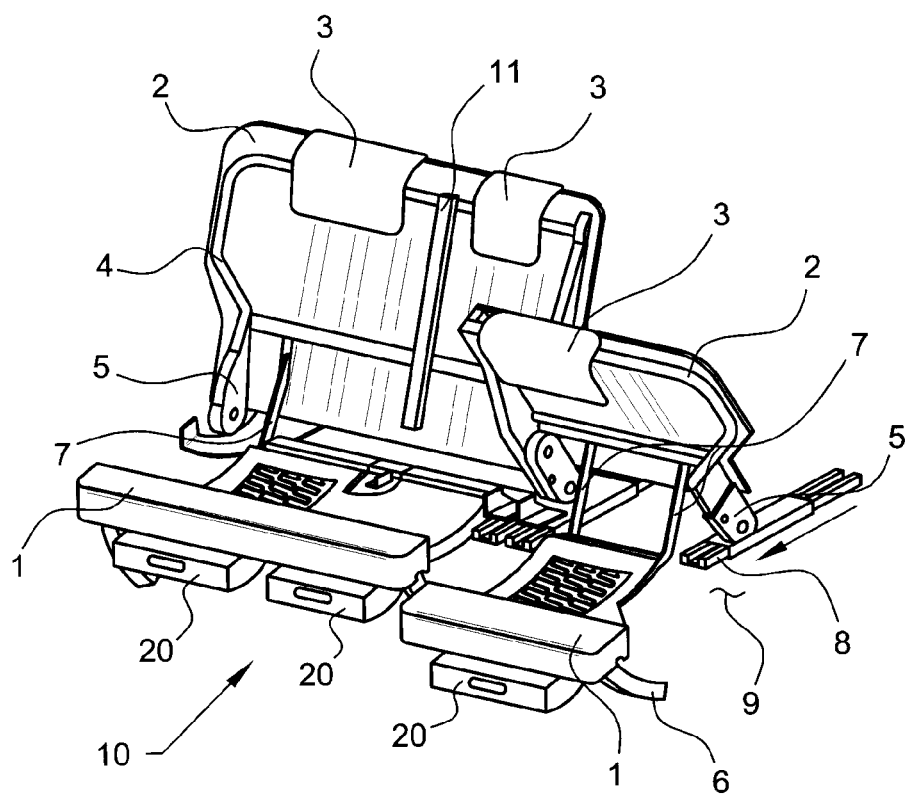
FIG. 2 shows a perspective front view of the split folding seat of FIG. 1 where one portion of the seat is partially lowered from a seating position to a cargo storage position.

Referring now to FIG. 2, there is shown a perspective view of the split folding seat 10 where one portion of the split folding seat 10 remains in an upright or seating position and the other portion of the split folding seat 10 has been partially folded toward the down or cargo position. At the point illustrated the partially folded seat portion has had the seat back frame 1 moved laterally forward to the front end of parallel track units 8 that are permanently mounted to the vehicle floor 9. The top of the seat back frame 2 has been rotated forward and downward on hinges 5 causing the linkage arms 7 to push the seat cushion frame 1 to move forward and downward pivoting on legs 6 which are moveably mounted to both the seat cushion frame 1 and the vehicle floor 9. Also shown are head restraints 3, head restraint mounting members 4, additional head restraint support member 11, and storage units 20.

Figure 3:
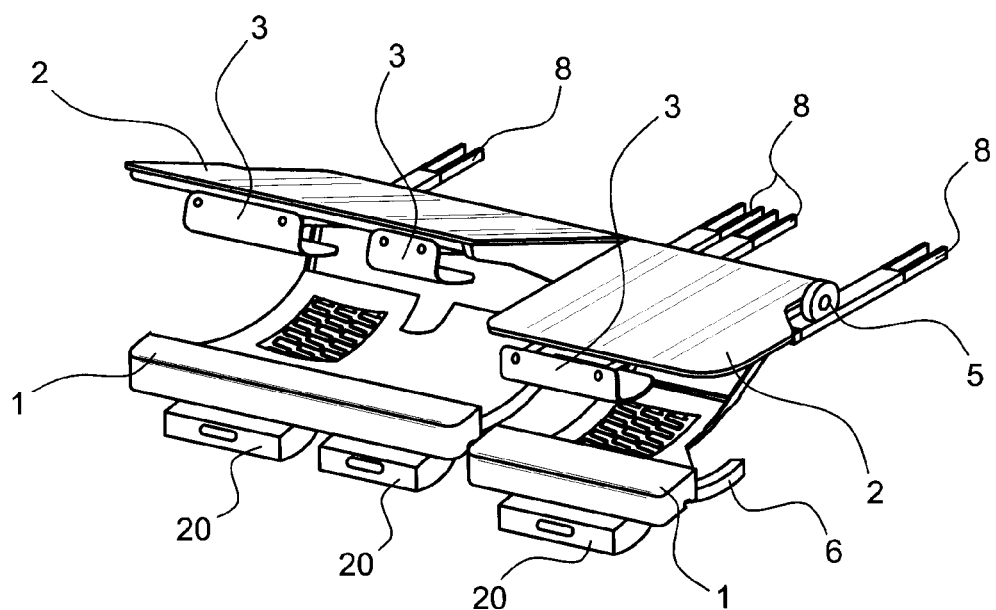
FIG. 3 shows a perspective front view of the split folding seat of FIG. 1 where one portion of the seat is completely lowered to the cargo storage position and the other portion of the seat is partially lowered into a cargo storage position.

Turning now to FIG. 3, there is shown a perspective view of the split folding seat 10 where one portion of the split folding seat 10 is completely lowered into the down or cargo position and the other portion of the split folding seat 10 is partially folded toward the down or cargo position. At the point illustrated the partially folded seat portion of FIG. 2 is now in the full down or cargo position with the seat back frame 2 substantially in a horizontal position and the seat cushion frame 1 of this portion of the split folding seat 10 is at the full extent of its travel forward and downward. The portion of the split folding seat 10 which was in the full upright or seating position is shown here in a partially folded toward the downward or cargo position. At the point illustrated the partially folded seat portion has had the seat back frame 1 moved laterally forward to the front end of parallel track units 8 that are permanently mounted to the vehicle floor 9. The top of the seat back frame 2 has been rotated forward and downward on hinges 5 causing the linkage arms 7 (FIGS. 1, 2) to push the seat cushion frame 1 to move forward and downward pivoting on legs 6 which are moveably mounted to both the seat cushion frame 1 and the vehicle floor 9. Also shown are storage units 20.

Figure 4:
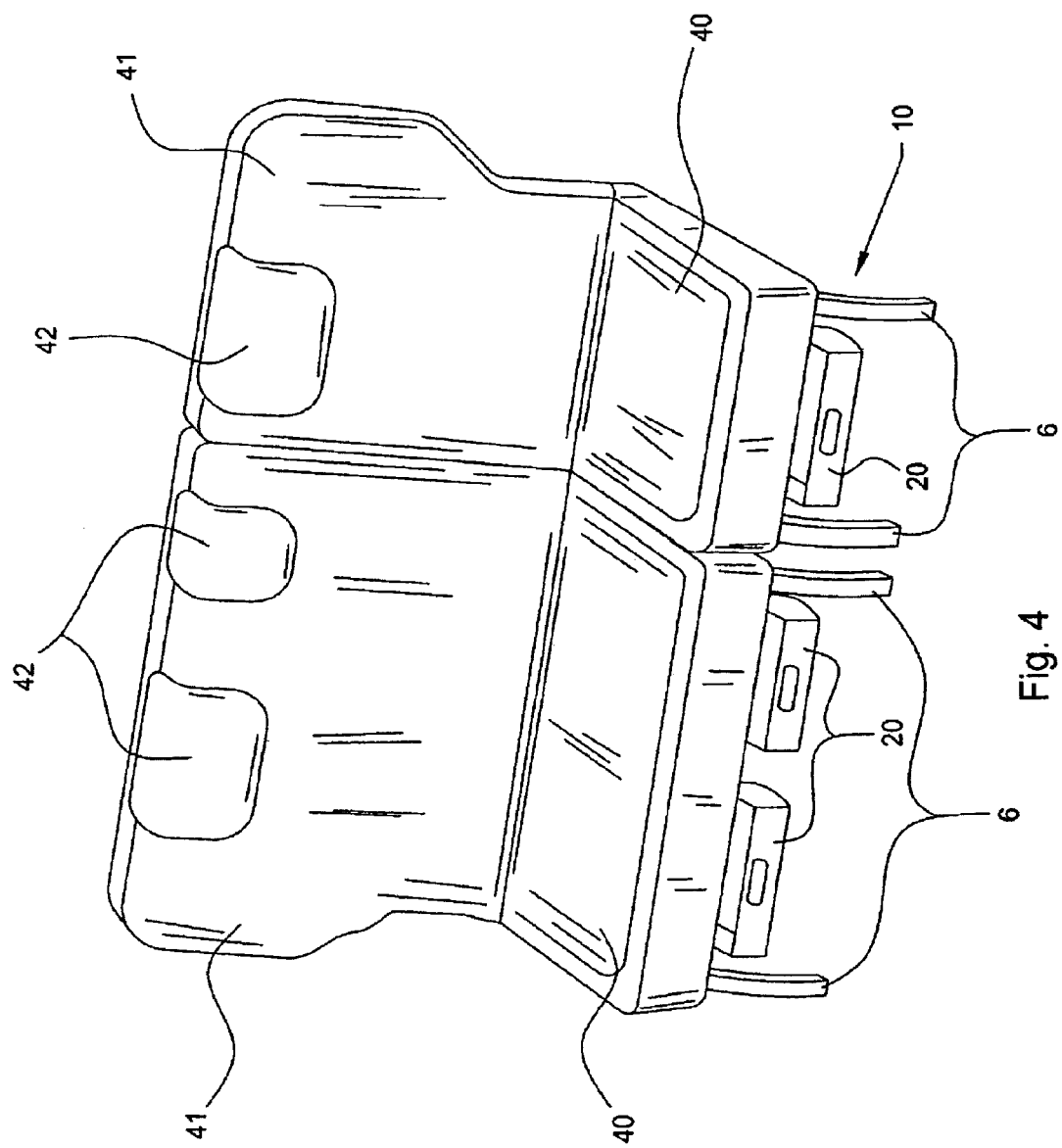
FIG. 4 shows a perspective front view of the split folding seat of FIG. 1 with the head restraints, seat cushions and seat hack cushions identified.

Finally, turning to FIG. 4 there is shown a perspective view of the split folding seat 10 in a fully open position ready for occupancy showing seat cushions 40 and seat back cushions 41 installed. Also shown are head restraints 42, storage compartments 20, and legs 6.

For the preferred embodiments of the present invention having a reclining seat back the presently preferred seat back hinges 5 are produced by Keiper Recargo Gruppe under the brand name Fold 2000.

Presently preferred material for the constructing the frame and mounting members of the present invention is steel.

It is to be appreciated that while the present invention's particular embodiments disclosed herein are for a split seat, that the present invention will also be applicable to non-split seats or only one portion of a split seat.

Although the preferred embodiments of the present invention has been disclosed, various changes and modifications may be made without departing from the scope of the invention as set forth in the appended claims.

The invention claimed is:

1. A split folding seat assembly for mounting to a vehicle floor, said vehicle floor having at least one passenger foot area, comprising a pair of passenger seats which may be independently folded from a seating position to a cargo position and back with a minimum of effort for use in a vehicle providing a split folding seat assembly in which the seat cushion is moved from a seating position forward and downward into a storage position in said passenger foot area and the seat back is moved forward and downward into the seat cushion seating position providing a flat load floor over a cargo area and the seat back comprising in cooperative combination:

a pair of seat cushion frames, each of said seat cushion frames being moveably mounted by their front edges to a pair of legs, and said pair of seat cushion frames rear edges moveably mounted to a corresponding pair of seat back frames by a pair of seat folding links and further each said seat cushion frame having a seat cushion mounted thereon;

two pair of seat legs having one end of each of said two pair of seat legs moveably mounted to the front edge of each of said seat cushion frames and the other end of each of said two pair of seat legs adapted to be moveably mounted to a vehicle floor, a pair of seat back frames, each of said seat back frames being moveably mounted on their bottom edges to the rear edge of the corresponding seat cushion frame by a pair of seat folding links, and further attached by their bottom edges by a pair of hinges to a pair of parallel seat tracks, and further each of said pair of seat back frames having a head restraint mounting member to which are attached a desired number of head restraints and each of said seat back frames having a seat back cushion mounted thereon; and a pair of parallel tracks, adapted to be fixedly mounted to a vehicle floor, for each of said pair of passenger seats having a seat back frame mounted thereto by means of a hinge allowing the seat backs to be independently moved laterally along the pair of parallel tracks during the folding and unfolding of each of said passenger seats.

2. The split folding seat assembly as claimed in claim 1 wherein, at least one of said seat back frames has an additional head restraint support member.

3. The split folding seat assembly as claimed in claim 1 wherein, at least one storage compartment is mounted below at least one of said pair of seat cushion frames.

4. The split folding seat assembly as claimed in claim 1 wherein, said split folding seat assembly is mountable on a vehicle floor having a configuration allowing said split folding seat assembly when in a folded position to provide a cargo surface contiguous wit the vehicle cargo floor.

5. A split folding seat assembly for mounting to a vehicle floor, said vehicle floor having at least one passenger foot area, comprising a pair of passenger seats which may be independently folded from a seating position to a cargo position and back with a minimum of effort for use in a vehicle providing a split folding seat assembly in which the seat cushion is moved from a sealing position forward and downward into a storage position in said passenger foot area and the seat back is moved forward and downward into the seat cushion seating position providing a flat load floor over a cargo area and the seat back comprising in cooperative combination:

a pair of seat cushion frames, each of said seat cushion frames being moveably mounted by their front edges to a pair of legs, and said pair of seat cushion frames rear edges moveably mounted to a corresponding pair of seat back frames by a pair of seat folding links and further each said seat cushion frame having a seat cushion mounted thereon;

two pair of seat legs having one end of each of said two pair of seat legs moveably mounted to the front edge of each of said seat cushion frames and the other end of each of said two pair of seat legs adapted to be moveably mounted to a vehicle floor;

a pair of seat back frames, each of said seat back frames being moveably mounted on their bottom edges to the rear edge of the corresponding seat cushion frame by a pair of seat folding links, and further attached by their bottom edges by a pair of folding and reclining hinges to a pair of parallel seat tracks, and further each of said pair of seat back frames having a head restraint mounting member to which are attached a desired number of head restraints and each of said seat back frames having a seat back cushion mounted thereon; and a pair of parallel tracks, adapted to be fixedly mounted to a vehicle floor, for each of said pair of passenger seats having a seat back frame mounted thereto by means of a hinge allowing the seat backs to be independently moved laterally along the pair of parallel tracks during the folding and unfolding of each of said passenger seats.

6. The split folding seat assembly as claimed in claim 5 wherein, at least one of said seat back frames has an additional head restraint support member.

7. The split folding seat assembly as claimed in claim 5 wherein, at least one storage compartment is mounted below at least one of said pair of seat cushion frames.

8. The split folding seat assembly as claimed in claim 5 wherein, said split folding seat assembly is mountable on a vehicle floor having a configuration allowing said split folding seat assembly when in a folded position to provide a cargo surface contiguous with the vehicle cargo floor.

9. A folding seat assembly for mounting to a vehicle floor, said vehicle floor having at least one passenger foot area, comprising a passenger seat which may be folded from a seating position to a cargo position and back with a minimum of effort for use in a vehicle providing a folding seat assembly in which the seat cushion is moved from a seating position forward and downward into a storage position in said passenger foot area and the seat back is moved forward and downward into the seat cushion seating position providing a flat load floor over The seat back comprising in cooperative combination:

a seat cushion frame, said seat cushion frame being moveably mounted by its front edge to a pair of legs, and said seat cushion frame rear edge moveably mounted to a corresponding seat back frame by a seat folding link and further said seat cushion frame having a seat cushion mounted thereon;

a pair of seat legs having one end of each of said seat legs moveably mounted to the front edge of said seat cushion frame and the other end of each of said legs adapted to be moveably mounted to a vehicle floor;

a seat back frame, said seat back frame being moveably mounted on its bottom edge to the rear edge of the corresponding seat cushion frame by a u-shaped seat folding link, and further attached by its bottom edge by a pair of hinges to a pair of parallel seat tracks, and further said seat back frame having a head restraint mounting member to which is attached a head restraint and said seat back frame having a seat back cushion mounted thereon; and a pair of parallel tracks, adapted to be fixedly mounted to a vehicle floor, for said passenger seat having a seat back frame mounted thereto by means of a hinge allowing the seat back to be independently moved laterally along the pair of parallel tracks during the folding and unfolding of said passenger seat.

10. The split folding seat assembly as claimed in claim 9 wherein, said seat back frame has at least one additional head restraint support member.

11. The split folding seat assembly as claimed in claim 9 wherein, a storage compartment is mounted below said seat cushion frame.

12. The split folding seat assembly as claimed in claim 9 wherein, said folding seat assembly is mountable on a vehicle floor having a configuration allowing said folding seat assembly when in a folded position to provide a cargo surface level with the vehicle cargo floor.

13. A folding seat assembly for mounting to a vehicle floor, said vehicle floor having at least one passenger foot area, comprising a passenger seat which may be folded from a seating position to a cargo position and back with a minimum of effort for use in a vehicle providing a folding seat assembly in which the seat cushion is moved from a seating position forward and downward into a storage position in said passenger foot area and the seat back is moved forward and downward into the seat cushion seating position providing a flat load floor over the seat back comprising in cooperative combination:

- a seat cushion frame, said seat cushion frame being moveably mounted by its front edge to a pair of legs, and said seat cushion frame rear edge moveably mounted to a corresponding seat back frame by a seat folding link and further said seat cushion frame having a seat cushion mounted thereon;
- a pair of seat legs having one end of each of said seat legs moveably mounted to the front edge of said seat cushion frame and the other end of each of said legs adapted to be moveably mounted to a vehicle floor;
- a seat back frame, said seat back frame being moveably mounted on its bottom edge to the rear edge of the corresponding seat cushion frame by a u-shaped seat folding link, and further attached by its bottom edge by a pair of folding and reclining hinges to a pair of parallel seat tracks, and further said seat back frame having a head restraint mounting member to which is attached a head restraint and said seat back frame having a seat back cushion mounted thereon; and
- a pair of parallel tracks, adapted to be fixedly mounted to a vehicle floor, for said passenger seat having a seat back frame mounted thereto by means of a hinge allowing the seat back to be independently moved laterally along the pair of parallel tracks during the folding and unfolding of said passenger seat.

14. The split folding seat assembly as claimed in claim 13 wherein, said seat back frame has at least one additional head restraint support member.

15. The split folding seat assembly as claimed in claim 13 wherein, a storage compartment is mounted below said seat cushion frame.

16. The split folding seat assembly as claimed in claim 13 wherein, said folding seat assembly is mountable on a vehicle floor having a configuration allowing said folding seat assembly when in a folded position to provide a cargo surface level with the vehicle cargo floor.

* * * * *